United States Patent [19]

Seely

[11] Patent Number: 4,611,895
[45] Date of Patent: Sep. 16, 1986

[54] METERING ROLL FILM HOLDERS AND MULTI-FORMAT CAMERA

[75] Inventor: Neil G. Seely, Rochester, N.Y.

[73] Assignee: Eastman Kodak Company, Rochester, N.Y.

[21] Appl. No.: 707,932

[22] Filed: Mar. 4, 1985

[51] Int. Cl.$^4$ ............................................. G03B 17/02
[52] U.S. Cl. ..................................... 354/159; 354/21
[58] Field of Search ................. 354/21, 159, 210, 216, 354/275; 352/78 C, 79

[56] References Cited
U.S. PATENT DOCUMENTS
2,926,424  3/1960  Weiss ..................................... 33/129

Primary Examiner—Michael L. Gellner
Attorney, Agent, or Firm—Roger A. Fields

[57] ABSTRACT

A multi-format camera is provided for taking pictures in several different sizes, such as $2\frac{1}{4} \times 1\frac{5}{8}$ ins. and $2\frac{1}{4} \times 2\frac{3}{4}$ ins., on separate rolls of similar length film. A plurality of roll film holders for the different picture sizes have respective frames for carrying the similar length rolls and respective metering assemblies for advancing the film over the frames in different length increments corresponding to the different picture sizes. Each of the metering assemblies has at least one gear member situated at the same location on the film holders. The camera includes a single drive gear positioned for engagement with the gear member of the metering assembly on a film holder received in the camera, and manual or automatic means for rotating the drive gear between exposures to advance roll film in the particular length increments determined by such metering assembly.

9 Claims, 9 Drawing Figures

METERING ROLL FILM HOLDERS AND MULTI-FORMAT CAMERA

CROSS REFERENCE TO RELATED APPLICATIONS

Reference is made to commonly assigned, copending patent applications Ser. No. 707,933, filed Mar. 4, 1985 in the names of Donald M. Harvey and Neil G. Seely and entitled CODED ROLL FILM HOLDER AND CODE RESPONSIVE CAMERA and Ser. No. 707,834, filed Mar. 4, 1985 in the same names and entitled ROLL RILM HOLDERS AND MULTIFORMAT CAMERA.

BACKGROUND OF THE INVENTION

1. Field of the Invention

The invention generally relates to roll film holders and to roll film cameras. More particularly, the invention relates to a multi-format camera for taking different size pictures on separate rolls of film and to roll film holders having respective metering mechanisms for advancing the film in different length increments to enable multi-format use of the camera.

2. Description of the Prior Art

Roll (non-perforated) film is backed with an opaque paper strip which has printed numbers corresponding to the number of negative spaces on the film. The most popular roll film, probably size 120 film, is approximately 2.45 ins. (6.22 cm.) wide. The backing paper on size 120 film has several series of numbers. A first series is numbered proximate one longitudinal edge of the paper to give 16 exposures to the roll measuring $2\frac{1}{4} \times 1\frac{5}{8}$ ins. ($6 \times 4.5$ cm.). Another series is numbered along the longitudinal center of the paper to give 12 exposures measuring $2\frac{1}{4} \times 2\frac{1}{4}$ ins. $6 \times 6$ cm.). A third series is numbered proximate the other longitudinal edge of the paper to give 8 exposures measuring $\frac{1}{4} \times 3\frac{1}{4}$ ins.($6 \times 9$ cm.). A fourth useful possibility, which is not numbered on the paper, is 10 exposures to the roll measuring $2\frac{1}{4} \times 2\frac{3}{4}$ ins. ($6 \times 7$ cm.).

Roll film cameras equipped to take pictures in two or more of the different sizes, i.e., $2\frac{1}{4} \times 1\frac{5}{8}$ ins., $2\frac{1}{4} \times 2\frac{1}{4}$ ins., $2\frac{1}{4} \times 3\frac{1}{4}$ ins., and $2\frac{1}{4} \times 2\frac{3}{4}$ ins., on separate rolls of film having the same length and width, are referred to as multi-format cameras. Many of these cameras are used with several roll film holders for taking the respective size pictures. To take pictures in a different size, the roll film holder being used must be removed from the camera and replaced by a film holder corresponding to the desired picture size.

In a multi-format camera, the film metering, that is, the length of film travel between successive exposures, differs in accordance with the format, i.e., the picture size, being used. Thus, when changing the roll film holder in the camera to take pictures in a different size, the metering mechanism or the drive for such mechanism must be altered to change the length of film travel to accomodate the desired picture size.

One proposed solution to the problem of providing for different film metering in a multiformat camera is described in U.S. Pat. No. 2,926,424. That solution involves the use of interchangeable metering units for advancing roll film in different length increments. One metering unit is taken out of the camera and replaced by a different metering unit, to change to the length of film travel required for taking pictures in a different size. Another proposed solution which is described in the same patent attacks the problem from a different approach by employing a single, permanent metering unit for the different picture sizes. That solution involves the use of a manually shiftable transmission for driving the metering unit to provide the different lengths of film travel required for the different picture sizes.

Although the proposed solutions in U.S. Pat. No. 2,926,424 to the problem of providing different film metering in a multi-format camera may accomplish their intended purpose, they have several drawbacks. For example, each time a change in the picture size is desired, there must be an exchange of interchangeable metering units in the camera before an exchange of film holders can be completed. Alternatively, the photographer must remember to operate the shiftable transmission for the permanent metering unit.

SUMMARY OF THE INVENTION

The problem of changing the film metering in a multi-format camera each time a change in the picture size is desired, is believed solved by the invention in an improved manner as compared to the prior art solutions described above. Generally, the invention provides roll film holders having respective metering means for advancing the roll film in different length increments to enable multi-format use of the camera, and derive means in the camera for operating the respective metering means each time a film holder is loaded in the camera.

According to the invention, there is provided a multi-format camera for taking pictures in several different sizes, such as $2\frac{1}{4} \times 1\frac{5}{8}$ ins. and $2\frac{1}{4} \times 2\frac{3}{4}$ ins., on separate rolls of similar length film. A plurality of roll film holders for the different picture sizes have respective frames for carrying the similar length rolls and respective metering assemblies for advancing the film over the frames in different length increments corresponding to the different picture sizes. Each of the metering assemblies has at least one driven member situated at the same location on the film holders. The camera includes a drive member positioned for engagement with the driven member of the metering asssembly on a film holder received in the camera, and manual or automatic means for moving the drive member between exposures to advance roll film in the prticular length increments determined by such metering assembly.

BRIEF DESCRIPTION OF THE DRAWINGS

The invention will be described in connection with the drawings, wherein.

DESCRIPTION OF THE PREFERRED EMBODIMENT

The invention is described as being embodied in a pair of roll film holders for two different negative sizes and in a dual-format camera adapted to receive the film holders. Because such film holders and cameras are well known, this description is directed in particular to those elements forming part of or cooperating directly with the preferred embodiment. It is to be understood, however, that other elements not specifically shown or described may take various forms known to persons of ordinary skill in the art.

Figure 1:
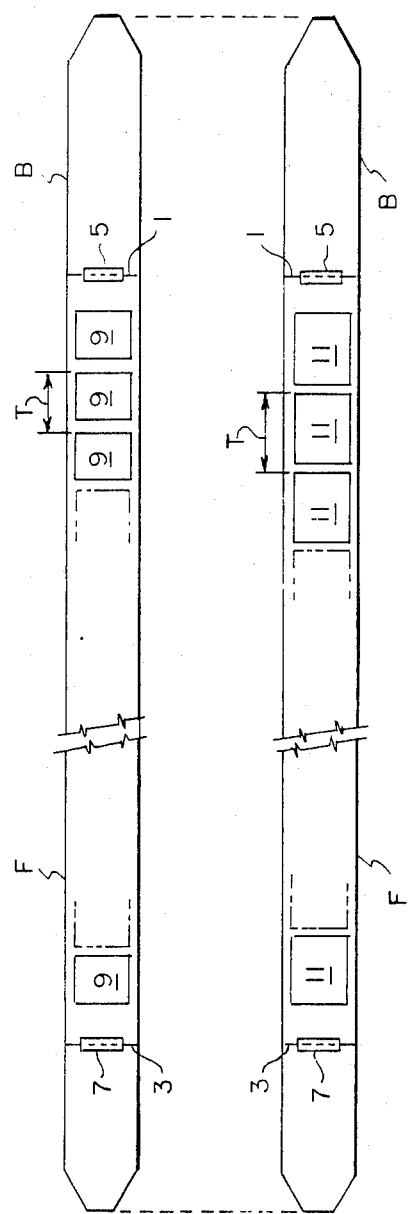
FIG. 1 is a plan view of size 120 roll film and backing paper, depicting the film in two instances with different size exposures.

Referring now to the drawings, and in particular to FIG. 1, there is shown two similar rolls of a conventional size 120 film, such as Kodak Verichrome Pan film for black and white prints. In each instance, the film roll is laid out flat to reveal the full length of the film F and an opaque backing paper B. The film F is attached to the backing paper B at leading and trailing ends 1 and 3 of the film by respective adhesive-backed pasters 5 and 7. As shown in FIG. 1, the upper film roll has sixteen exposures 9 each measuring $2\frac{1}{4} \times 1\frac{5}{8}$ ins. (6×4.5 cm.). The dimension $2\frac{1}{4}$ ins. represents the width of an exposure 9 measured across the film F, and the dimension $1\frac{5}{8}$ ins. represents the length of the exposure measured along the film. The lower film roll has ten exposures 11 each measuring $2\frac{1}{4} \times 2\frac{3}{4}$ ins. (6×7 cm.). Similarly, the dimension $2\frac{1}{4}$ ins. represents the width of an exposure 11 and the dimension $2\frac{3}{4}$ ins. represents the length of the exposure. As depicted, the two film rolls have the same length and the same width. However, the length T of film travel between the successive exposures 9 or 11 on the two film rolls will be different because of the difference in exposure length, i.e., $1\frac{5}{8}$ ins. and $2\frac{3}{4}$ ins., on such rolls. In FIG. 1, the length T between the leading side of one exposure 9 on the upper film roll and the leading side of the next exposure on such roll is $1\frac{7}{8}$ ins. (4.8 cm.), and the length T between the leading side of one exposure 11 on the lower film roll and the leading side of the next exposure on such film roll is 3 ins. (7.6 cm.).

Figure 2:
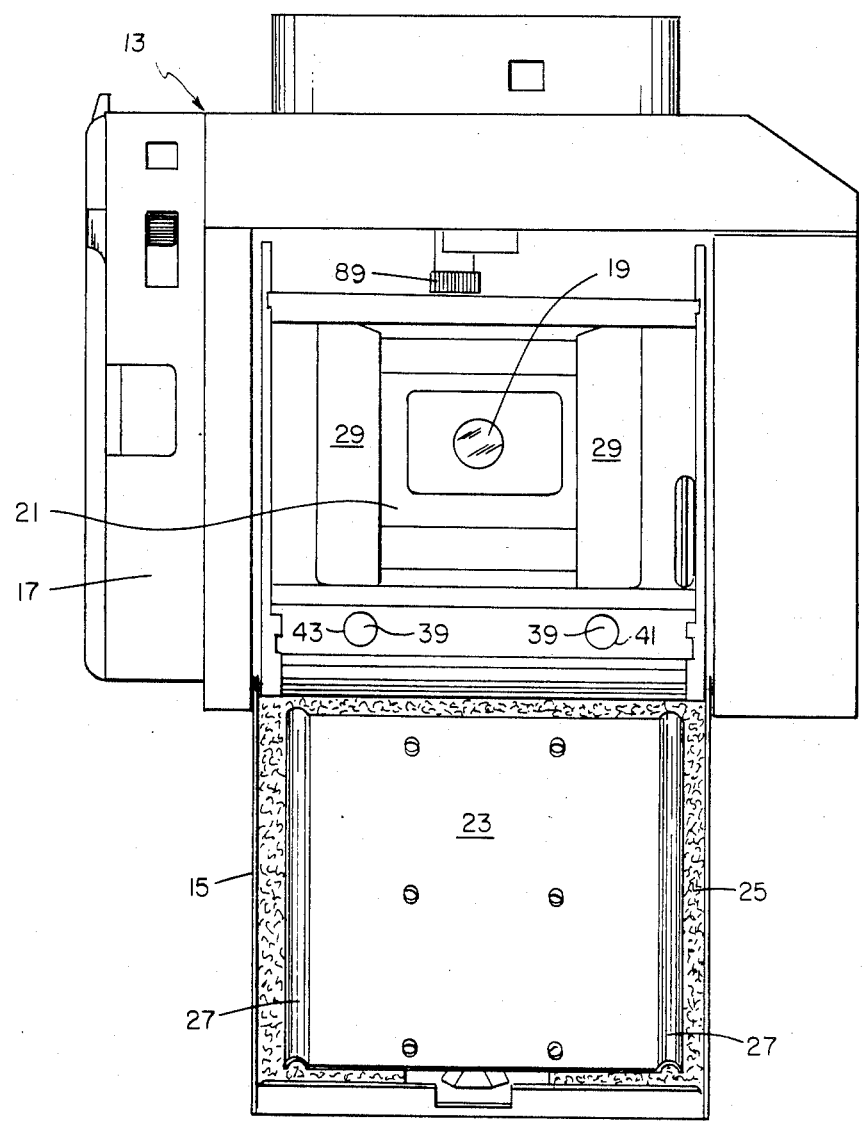
FIG. 2 is a rear elevation view of a dualformat camera for taking pictures in the two different sizes, according to a preferred embodiment of the invention.

A dual-format camera 13 is illustrated in FIG. 2 for taking pictures in the two different sizes $2\frac{1}{4} \times 1\frac{5}{8}$ ins. and $2\frac{1}{4} \times 2\frac{3}{4}$ ins. on separate rolls of the film F, shown in FIG. 1. The dual-format camera 13 is depicted with a back door 15 pivoted open from a camera body 17. A taking lens 19 centrally arranged at the front of the camera body 17 forms a focal plane within the camera body. A rectangular-shaped opening 21 in the camera body 17 is centered on the optical axis of the taking lens 19. The rectangular-shaped opening 21 defines a similar shaped exposure area for recording a picture on a film portion lying in the focal plane of the lens 21. A resiliently flexible plate 23 connected to the back door 15 rests on a sponge-like backing pad 25 which serves as a light lock. The plate 23 has a pair of raised edge sections 27 for supporting a roll film holder received in the camera body 17, to position successive portions of the roll film in the focal plane.

Figure 3:
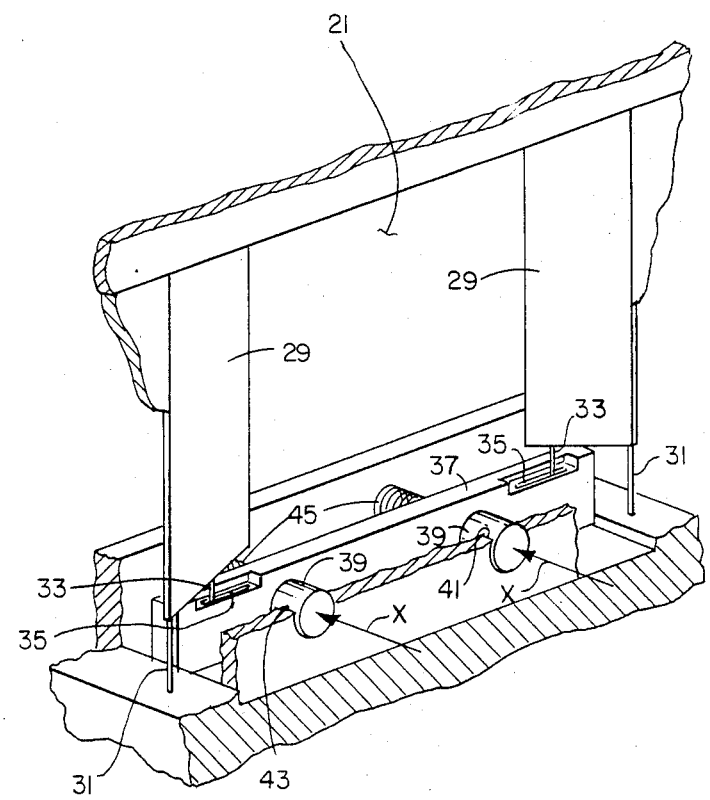
FIG. 3 is a rear perspective view of a masking mechanism in the camera for changing the effective size of the exposure area in conformity with the particular size of the pictures to be taken.

As shown in FIG. 3, a pair of masking flaps 29 are supported within the camera body for swinging movement on separate pivot posts 31 to change the actual size of the opening 21 defining the exposure area to respective sizes corresponding to the two picture sizes, $2\frac{1}{4} \times 1\frac{5}{8}$ ins. and $2\frac{1}{4} \times 2\frac{3}{4}$ ins. The two masking flaps 29 are movable between a masking position, depicted in FIG. 2, covering opposite end portions of the opening 21 to reduce the effective size of the exposure area to $2\frac{1}{4} \times 1\frac{5}{8}$ ins. and a non-masking position, depicted in FIG. 3, removed from the opposite end portions of the opening to enlarge the effective size of the exposure area to $2\frac{1}{4} \times 2\frac{3}{4}$ ins. Each of the masking flaps 29 includes a cam follower pin 33 having a free end movably disposed within a cam slot 35 in a motion transmitting bar 37. The motion transmitting bar 37 includes a pair of depressible posts 39 supported for longitudinal movement in respective openings 41 and 43. When the two posts 39 are pushed inward of the openings 41 and 43, as indicated by the pair of arrows X in FIG. 3, the bar 37 is shifted in the same direction to move the two masking flaps 29 to their non-masking position. Normally, however, a pair of helical compression springs 45 bearing against the bar 37 urge the mask flaps 29 to their masking position and urge the posts 39 outward of the openings 41 and 43.

Figure 4A:
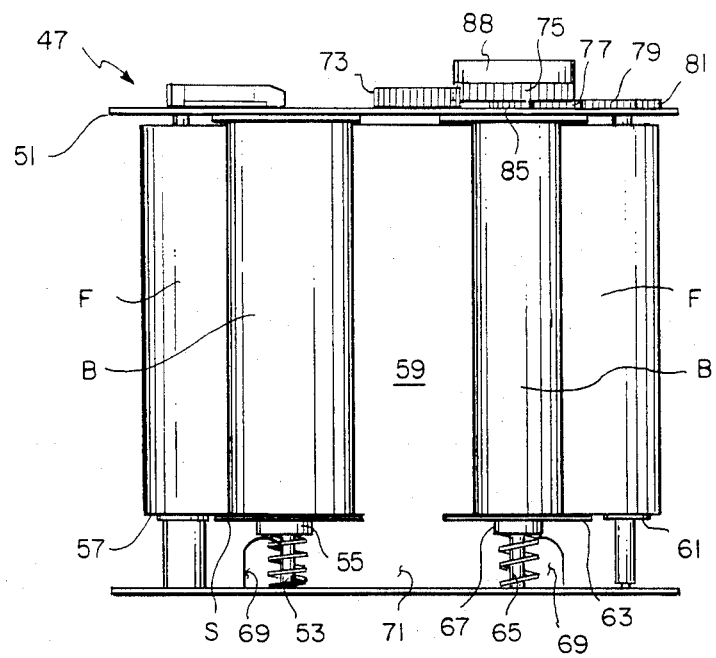
FIGS. 4A and 4B are rear elevation views of respective roll film holders for the different size exposures, according to the preferred embodiment of the invention.
Figure 4B:
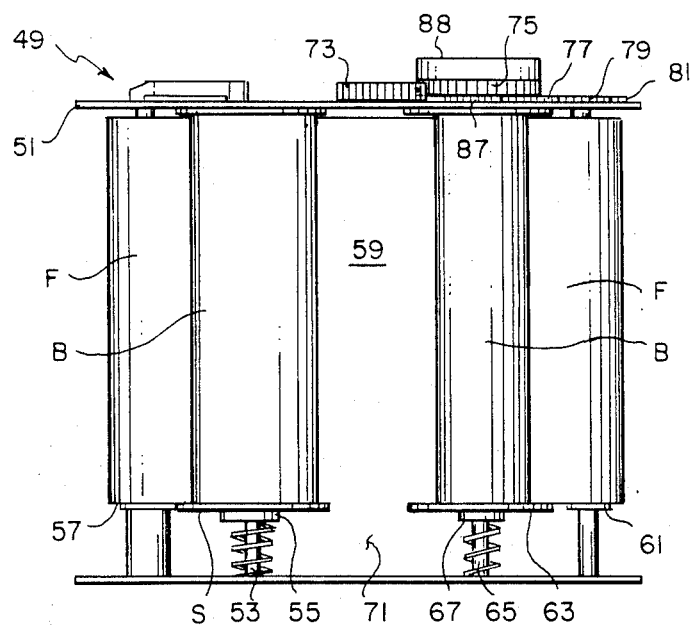

FIG. 4A shows a roll film holder 47 used in the camera 13 to take $2\frac{1}{4} \times 1\frac{5}{8}$ ins. pictures on the roll film F. FIG. 4B shows a roll film holder 49 used in the camera 13 to take $2\frac{1}{4} \times 2\frac{3}{4}$ ins. pictures on the roll film F. Where the two roll film holders 47 and 49 are identical, the same reference numbers are used in describing their respective components. Otherwise, different reference numbers are used.

Each of the film holders 47 and 49 includes a frame 51 generally having the same dimensions for carrying a similar length roll of the film F. The film F is provided (in unexposed form) wound on a supply spool S with the backing paper B at the outer side of each convolution of the roll. The supply spool S is supported for rotation on a fixed post 53 on the frame 51, and is held in the proper unwinding position by a spring-urged washer 55 movable along the fixed post. During picture-taking in the camera 13, the film F (with the backing paper B) is advanced from the supply spool S, around an idler roller 57 on the frame 51, over a flat exposure plate 59 comprising part of the frame, around a metering roller 61 on the frame, and onto a take-up spool 63. The take-up spool 63 is supported for rotation on a fixed post 64 on the frame 51, and is held in the proper winding position by a spring urged washer 67 movable along the fixed post. As shown in FIGS. 4A and 4B, the film F is advanced over the idler roller 57, the exposure plate 59, and the metering roller 61, with the backing paper B located between the film and these components. In contrast, the film F is wound onto the take-up spool 63 with the backing paper B at the outer side of each convolution of the roll.

Figure 6:
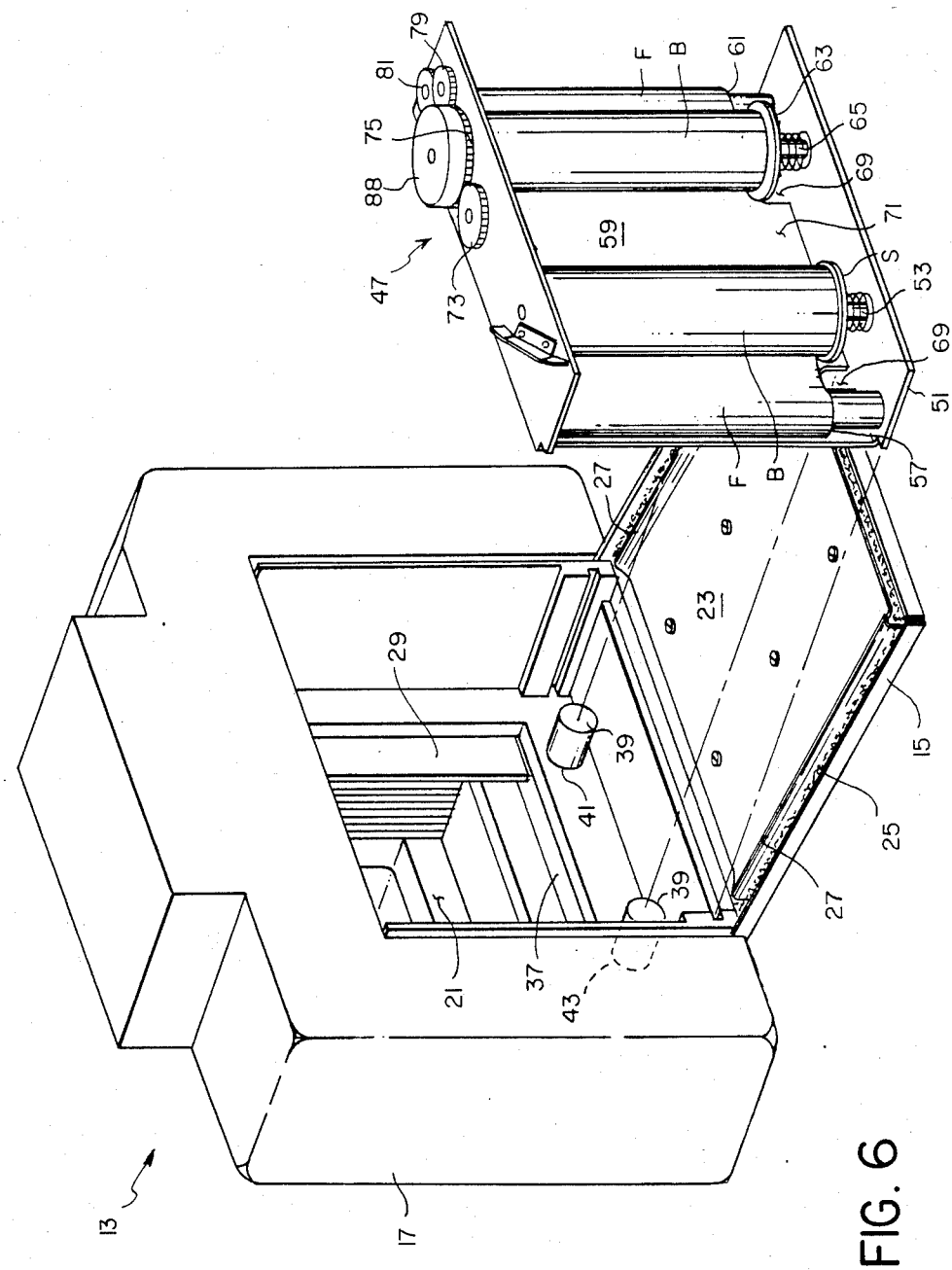
FIG. 6 is an exploded perspective view of one of the film holders loaded in the camera.

The roll film holder 47 includes a pair of coded means representative of the $2\frac{1}{4} \times 1\frac{5}{8}$ in. picture size. The two coded means on the film holder 47 are depicted in FIG. 4A as a pair of identical cut-outs 69 in the exposure plate 59, at respective predetermined locations along a coded region 71 on that plate. The predetermined locations of the two cut-outs 69 are chosen such that when the film holder 47 is loaded into the camera body 17, as shown in FIG. 6, the two depressible posts 39 on the motion transmitting bar 37 will enter the respective cut-outs. This permits the pair of masking flaps 29 to remain in their masking position, to maintain the effective size of the exposure area (defined by the opening 21) at 2¼×1⅝ ins.

Figure 7:
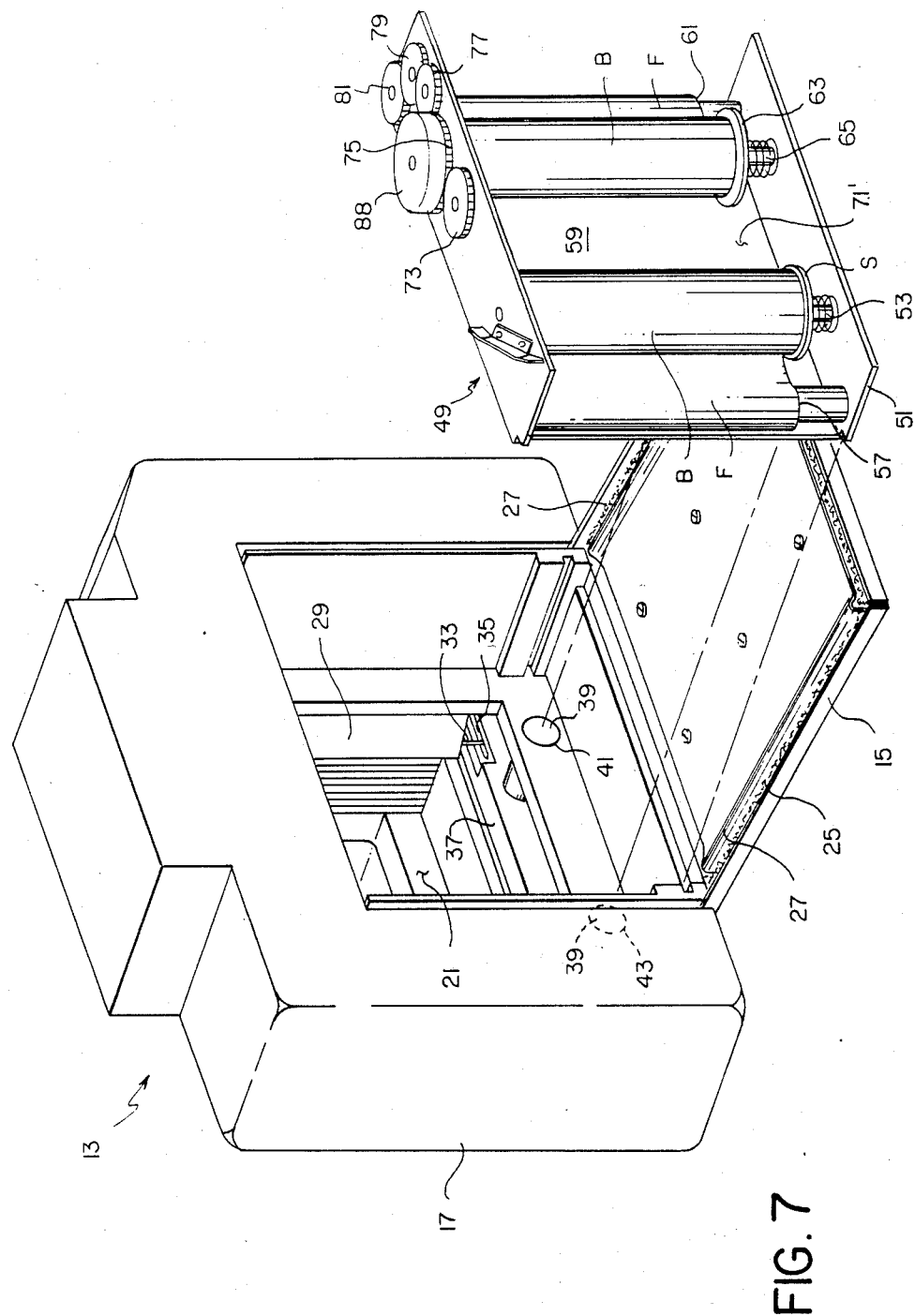
FIG. 7 is an exploded perspective view of the other film holder loaded in the camera.

The roll film holder 49 includes a pair of coded means representative of the 2¼×2¾ ins. picture size. The two coded means on the film holder 49 are depicted in FIG. 4B by the absence of respective cut-outs at the same two locations as occupied by the pair of cut-outs 69 on the film holder 47. That is to say, the coded region 71' on the film holder 49 is distinguished from the coded region 71 on the film holder 47 by the presence of respective portions of the exposure plate 59 where the two cut-outs 69 would otherwise be present. Thus, when the film holder 49 is loaded into the camera body 17, as shown in FIG. 7, the two posts 39 on the bar 37 will be pushed into the respective openings 41 and 43 by the exposure plate 59, thereby moving the pair of masking flaps 29 to their nonmasking position and enlarging the effective size of the exposure area to 2¼×2 ¾ ins.

Other details of the respective pairs of coded means on the two film holders 47 and 49 for representing the 2¼×1⅝ ins. and 2¼×2¾ ins. picture sizes ar disclosed in copending Ser. No. 707,934, entitled CODED ROLL FILM HOLDER AND CODE RESPONSIVE CAMERA and more fully cross-referenced above.

Figure 5A:
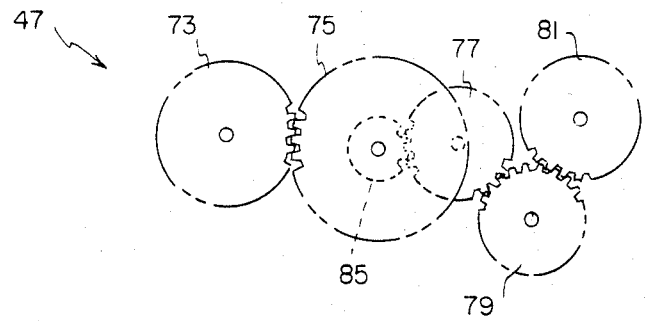
FIGS. 5A and 5B are plan views of respective gearing mechanisms in the two roll film holders for metering the roll film in different length increments between successive exposures.
Figure 5B:
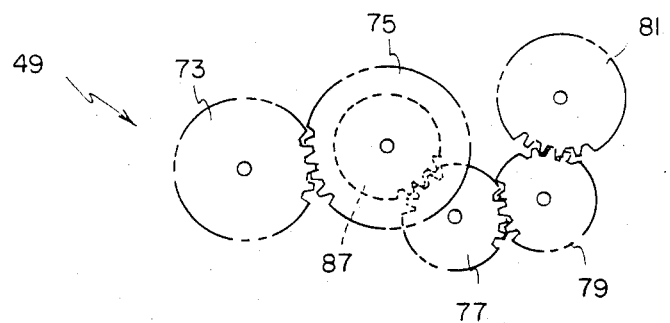

The film holder 47 includes metering means corresponding to the 2¼×1⅝ ins. picture size, for advancing the roll film F in 1⅞in. increments between successive exposures to provide sixteen exposures 9 to the roll. Conversely, the film holder 49 includes metering means corresponding to the 2¼×2¾ ins. picture size, for advancing the roll film F in 3 in. increments between successive exposure to provide ten exposures 11 to the roll. The respective metering means for the film holders 47 and 49 are shown in FIGS. 4A, 5A and 4B, 5B. In essence, the two film holders 47 and 49 have identical actuating gears 73 engaging identical take-up gears 75, mounted in coaxial relation with the take-up spools 63, to rotate either one of such spools at the same speed on the two film holders when a corresponding one of the actuating gears is rotated. Also, the two film holders 47 and 49 have similar pairs of intermediate engaging gears 77 and 79. The respective intermediate gears 79 engage similar roller gears 81, mounted in coaxial relation with the metering rollers 61. The metering roller 61 on the film holder 47 must be rotated at a slower speed than the metering roller 61 on the film holder 49 to effect less film travel between successive exposures when using the first-mentioned holder. To accomplish this, the film holder 47 has a smaller size reduction or metering gear 85 than the other reduction or metering gear 87 on the film holder 49. As shown in FIG. 5A, the metering gear 85 is fixed in coaxial relation to the take-up gear 75 on the film holder 47 and has 16 teeth disposed to engage the intermediate gear 77 on that film holder. As shown in FIG. 5B, the metering gear 87 is fixed in coaxial relation to the take-up gear 75 on the film holder 49 and has 26 teeth disposed to engage the intermediate gear 77 on that film holder. Thus, even though the metering gears 85 and 87 will be rotated at the same speed on the respective film holders 45 and 47, in response to rotation of the actuating gears 73 at the same speed on the two film holders, the intermediate gear 77 and therefore the metering roller 61 on the film holder 47 will be rotated at a slower speed than the same gear and roller on the film holder 49.

On each of the film holders 47 and 49, the pair of intermediate engaging gears 77 and 79 are arranged between the metering gear 85 or 87 and the roller gear 81 to cause the metering roller 61 to rotate to a slower speed than the take-up spool 63. This tensions the film length between the metering roller and the take-up spool. A slip clutch 88, shown in FIGS. 4A and 4B, is provided to prevent the film length from being overly tensioned, to avoid damaging the roll film F.

The multi-format camera 13, as shown in FIG. 2, includes a single speed drive gear 89 positioned for separate engagement with the respective actuating gears 73 on the film holders 47 and 49 when either one of the holders is loaded in the camera body 17. A known motor, not shown, is provided for rotating the single speed drive gear 89 between successive exposures to advance the roll film F in the different length increments i.e., 1 ⅞ in. and 3 in., determined by the respective metering gears 85 and 87 on the film holders 47 and 49. Alternatively, known manually operated means may be provided for rotating the drive gear 89 between exposures.

While the invention has been described with reference to a preferred embodiment, it will be understood that various modifications may be effected within the ordinary skill in the art without departing from the scope of the invention. For example, instead of using the invention with only two picture sizes, 2¼×1⅝ ins. and 2¼×2¾ ins., the invention may be used with numerous other picture sizes, such as 2¼×2¼ ins. and 2¼×3¼ ins.

I claim:

1. A roll film holder adapted for use with a multi-format camera for taking different size pictures on separate rolls of similar length film, wherein said film holder is of the type having a frame, means on said frame for supporting a roll of unexposed film, and rotatable means on said frame for taking-up successive portions of film exposed in a focal plane in the camera, and wherein the improvement comprises:

metering means corresponding to a selected one of the picture sizes, said metering means being positioned on said frame for advancing roll film on the frame in predetermined length increments related to the selected size, whereby a predetermined number of exposures may be obtained on the roll.

2. A pair of roll film holders adapted for use with a multi-format camera for taking different size pictures on separate rolls of similar length film, wherein said film holders are of the type having respective frames with substantially similar dimensions for carrying the similar length rolls, means on each of said frames for supporting a roll of unexposed film, and rotatable means on each of said frames for taking-up successive portions of film exposed in a focal plane in the camera, and wherein the improvement comprises:

first metering means corresponding to one picture size, said first means being positioned on one of said frames for advancing roll film on that frame in first length increments between exposures to provide a first number of exposures on the roll; and second metering means corresponding to another picture size, said second means being positioned on the other frame for advancing roll film on that frame in second length increments between exposures to provide a second number of exposures on the roll.

3. The improvement as recited in claim 2, wherein said first and second metering means include respective identical gears disposed at the same location on said frames for separate engagement by a drive gear in the camera when either one of said film holders is used with the camera.

4. The improvement as recited in claim 3, wherein said first and second metering means include respective metering gears disposed for rotation by said identical gears, said metering gears having different numbers of teeth for advancing roll film on said frames in the first and second length increments.

5. The improvement as recited in claim 4, wherein said metering gears are supported for rotation in coaxial relation with said rotatable take-up means on each of said frames.

6. The improvement as recited in claim 2, wherein said rotatable take-up means on each of said frames includes similar take-up gears for rotating the individual take-up means at the same speed, and said first and second metering means includes respective metering rollers for advancing exposed film to said individual take-up means and respective metering gear assemblies for rotating each of said metering rollers at a slower speed than the individual take-up means to tension the film, said metering gear assemblies including respective metering gears supported for rotation in coaxial relation with said take-up gears and having different numbers of teeth to rotate said metering rollers at different speeds for advancing the film the first and second length increments.

7. A pair of roll film holders adapted for use with a multi-format camera for taking different size pictures on separate rolls of similar length film, wherein said film holders are of the type having respective frames with substantially similar dimensions for carrying the similar length rolls, means on each of said frames for supporting a roll of unexposed film, and rotatable means on each of said frames for taking-up successive portions of film exposed in a focal plane in the camera, and wherein the improvement comprises:

metering rollers supported for rotation on said frames to advance exposed film to each of said rotatable take-up means; and metering gear assemblies coupled with said metering rollers to rotate each of the rollers at a slower speed than said individual take-up means to tension the film, said gear assemblies including respective metering gears having different numbers of teeth for rotating said metering rollers at different speeds to advance the film in different length increments corresponding to different picture sizes.

8. The improvement as recited in claim 7, wherein said metering gear assemblies include respective identical gear means for rotating said metering gears, said respective gear means being disposed at the same location on said frames for separate engagement by a drive gear in the camera when either one of said film holders is used with the camera.

9. A multi-format camera for taking pictures in a plurality of sizes on separate rolls of similar length film, and adapted to receive a plurality of film holders for the different picture sizes having respective frames with substantially similar dimensions for carrying the similar length rolls of film and respective metering assemblies with similarly located actuating gears which when rotated cause the metering assemblies to advance film on the frames in different length increments corresponding to the different picture sizes, said camera comprising:

a taking lens for forming a focal plane;

means for positioning a film holder received in said camera to support successive portions of roll film in the focal plane;

a drive gear positioned for engagement with the actuating gear of the metering assembly on a received film holder to rotate the actuating gear; and means for rotating said drive gear between exposures, whereby roll film will be advanced in the particular length increments determined by the metering assembly on the received film holder.

* * * * *